(12) United States Patent
Maier

(10) Patent No.: US 8,882,440 B2
(45) Date of Patent: Nov. 11, 2014

(54) WAVE CHAMBER FOR A WAVE POWER PLANT, AND METHOD FOR PRODUCING THE SAME

(75) Inventor: Wolfgang Maier, Nattheim (DE)

(73) Assignee: Voith Patent GmbH, Heidenheim (DE)

( * ) Notice: Subject to any disclaimer, the term of this patent is extended or adjusted under 35 U.S.C. 154(b) by 505 days.

(21) Appl. No.: 13/259,740

(22) PCT Filed: May 12, 2010

(86) PCT No.: PCT/EP2010/002895
§ 371 (c)(1),
(2), (4) Date: Dec. 28, 2011

(87) PCT Pub. No.: WO2010/149249
PCT Pub. Date: Dec. 29, 2010

(65) Prior Publication Data
US 2012/0114506 A1 May 10, 2012

(30) Foreign Application Priority Data

May 20, 2009 (DE) .......................... 10 2009 022 126

(51) Int. Cl.
*F03B 11/00* (2006.01)
*F03B 13/14* (2006.01)

(52) U.S. Cl.
CPC ............... *F03B 13/142* (2013.01); *Y02E 10/38* (2013.01); *Y02E 10/32* (2013.01); *F05B 2240/40* (2013.01)
USPC .......................................... 415/3.1

(58) Field of Classification Search
CPC ........ F03B 13/12; F03B 13/14; F03B 13/141; F03B 13/142; F03B 13/148; F03B 13/26; F03B 13/266; F03B 2240/40; Y02E 10/38; Y02E 10/32
USPC ............. 415/2.1, 3.1, 4.1, 906, 909; 417/100; 290/42, 53; 60/497, 502
See application file for complete search history.

(56) References Cited

U.S. PATENT DOCUMENTS

| | | | | |
|---|---|---|---|---|
| 1,033,887 A * | 7/1912 | Griffin | ............................ | 52/295 |
| 1,069,328 A * | 8/1913 | Griffin | ............................ | 52/295 |
| 4,139,984 A * | 2/1979 | Moody et al. | ................... | 60/398 |
| 4,271,668 A * | 6/1981 | McCormick | ................... | 60/398 |
| 4,286,347 A * | 9/1981 | Modisette | ....................... | 60/398 |
| 4,441,316 A * | 4/1984 | Moody | ............................ | 60/398 |
| 4,533,292 A * | 8/1985 | Sugihara et al. | ........... | 415/211.1 |

(Continued)

FOREIGN PATENT DOCUMENTS

| | | |
|---|---|---|
| EP | 1 802 814 | 3/2009 |
| JP | 60-119379 | 6/1985 |

(Continued)

*Primary Examiner* — Edward Look
*Assistant Examiner* — Eldon Brockman
(74) *Attorney, Agent, or Firm* — Farjami & Farjami LLP

(57) ABSTRACT

In one aspect, there is provided a wave chamber for a wave power plant having a water inlet opening and an outlet leading to a ventilation channel including an air turbine. The wave chamber includes a free-standing stack of a plurality of chamber segments braced vertically by a large number of traction elements, where the lowest chamber segment of the plurality of chamber segments is associated at least indirectly with a thrust securing system, and where the thrust securing system contains a hollow element for insertion inserted into a bottom of a body of water.

16 Claims, 4 Drawing Sheets

(56) References Cited

U.S. PATENT DOCUMENTS

| | | | |
|---|---|---|---|
| 4,564,313 A | 1/1986 | Niswander | |
| 4,613,252 A | 9/1986 | Einstabland | |
| 5,191,225 A | 3/1993 | Wells | |
| 2007/0125037 A1* | 6/2007 | Meiners | 52/720.1 |
| 2008/0088133 A1 | 4/2008 | Nagata | |
| 2011/0012357 A1* | 1/2011 | Lai | 290/53 |
| 2011/0101696 A1* | 5/2011 | Holle et al. | 290/53 |

FOREIGN PATENT DOCUMENTS

| | | |
|---|---|---|
| JP | 11-201014 | 7/1999 |
| JP | 2000-18492 | 1/2000 |
| JP | 2008-95569 | 4/2008 |
| WO | WO 2006/037983 | 4/2006 |

* cited by examiner

WAVE CHAMBER FOR A WAVE POWER PLANT, AND METHOD FOR PRODUCING THE SAME

This is a U.S. national phase application which is based on, and claims priority from, PCT application Serial No. PCT/EP2010/002895, filed May 12, 2010, which claims priority from foreign application Serial No. 102009022126.3, filed May 20, 2009, in Germany.

The invention concerns a wave chamber for a wave power plant and a method for building the same.

For producing energy from sea waves, the motive energy thereof can be converted by means of a wave chamber at least partially into an air flow. See for instance document U.S. Pat. No. 5,191,225, which describes a wave power plant operating according to the principle of an oscillating water column. If the water inlet opening leading to the wave chamber is located below the water level and if an air volume is enclosed in the wave chamber, the water level inside the wave chamber will generate a damped vibration to the rhythm of the surging waves. An air turbine is located in a ventilation channel extending to the air compartment in the wave chamber for drawing power. For that purpose, a bidirectional turbine is preferred, in particular a turbine rotating in a single direction, such as a Wells turbine.

For efficient production of energy from sea waves, the wave chambers should have a certain size in order to compensate for the fluctuations of the mean sea water level. Wave chambers should moreover be designed for high loads due to the incoming sea. Their erection is additionally made more difficult by the permanent strong swell in areas appropriate for wave power plants. To circumvent this problematic, it has been suggested in document U.S. Pat. No. 4,613,252 to erect a wave chamber behind the protecting barrier of a cliff in dry conditions and blow up the inlet opening for the sea water only once said wave chamber has been completed.

Wave chambers are additionally disclosed in documents JP 60119379 A, U.S. Pat. No. 4,564,312 and EP 1 802 814 B1 which are connected to breakwaters to protect harbors or coastlines. But it is impossible to provide adequate support, regardless whether artificial or naturally, to protect the plant against the breakers. On the one hand, nature protection obligations, an insufficient water depth or an insufficient quality of exposed rocks may prohibit the erection of a wave chamber directly by the coasts. On the other hand, the case of artificial breakwaters raises the question, of an economically viable combination of wave protection function and wave energy use.

Free-standing wave chambers, which are stably are on the seabed, circumvent the aforementioned difficulties. Their erection is still expensive due to the constant swell. Under those circumstances, document JP 1218492 A suggests to build a wave chamber in a dry dock as a single-piece concrete element which is floatable using buoyancy bodies for transport purposes and thus to transport the wave chamber as a whole to the place of installation. This type of erection is also expensive and may have consequences when setting up a prefabricated wave chamber element on the seafloor.

The object of the invention is then to solve the aforementioned problems and to offer a free-standing wave chamber for a wave power plant which can be erected reliably with a simple installation vehicle even with a swell. Consequently, the wave chamber should be characterized by high service life and simple design scalability. Additionally, the use of divers should be dispensed with when erecting the wave chamber.

The object mentioned above is satisfied by the characteristics of the independent claims. Advantageous embodiments are divulged in the sub-claims.

The wave chamber according to the invention several vertically stacked chamber segments, which for instance can be designed as standardized prefabricated concrete components so that the vertical reach of the wave chamber can be adapted to the respective water depth. To do so, the stack of the chamber segments is braced vertically by a large number of traction elements as well as anchored on the seafloor securely against tipping and thrust loads. Besides, the modular structure of the wave chamber makes the individual parts quite manageable by means of a simple ship crane.

According to an advantageous embodiment of the invention, at least a portion of the traction elements is anchored at least indirectly in the bottom of the body of water. Anchoring with drilling anchors is particularly preferable for a rocky water bed. It is particularly advantageous when the traction elements directly run from the drilling anchors into guiding means disposed on the chamber segments. For a possible realization, the guiding means are disposed in the form of passage openings which extend in the stacking direction in the walls of the chamber segments. In such a case, the traction elements contribute during the erection at the same time to the positioning when stacking the chamber segments. To do so, the chamber segments are strung on at least one portion of the traction elements before being lowered on the stack, whereas elements are tensioned in such a way that the chamber segments are guided laterally against the wave pressure during the lowering process. Additionally, the positioning of the chamber segments relative to one another can be assisted by self-centering devices on the contact surfaces of adjacent chamber segments. In an advantageous embodiment, final centering is done by the traction elements which for that purpose have a length corresponding to the stack height of the chamber segments so as to brace the stacked chamber segments in order to constitute a monolithic assembly by applying a vertical load.

If the traction elements of the wave chamber are anchored using drilling anchors a foundation element, whereon the stack of the chamber segments is erected, is used advantageously at the same time as a centering device for the erection of the drilling anchors. According to a possible embodiment, the foundation element has for that purpose guide openings which determine the drilling pattern for the drilling anchors. To do so, the drilling pattern corresponds to the configuration of the guiding means disposed on the chamber segments for the traction elements so that the chamber segments can be strung and lowered along the traction elements.

In a further embodiment of the invention, a thrust securing system anchored in the bottom of the body of water is provided for absorbing the thrust loads acting on the wave chamber. Said protection system constitutes more advantageously a separate component. There is alternately the possibility of combining the thrust securing system and the anchoring system for the traction elements.

In a particularly preferred embodiment, the thrust securing system comprises a hollow element inserted into the bottom of the body of water. This can be a steel tube for instance which is screwed into the bottom of the body of water. The hollow element is consequently cut to length so that it extends over the bottom of the body of water up to a predetermined height. In a subsequent erection phase, a foundation element is rested on a bearing surface of the thrust securing system, typically the circumference face, on which foundation element the lowest chamber segment is lowered. The traction elements extend preferably from the foundation element, as represented above or said foundation element serves as a centering device for the construction of the anchoring system of the traction elements.

A thrust connection is moreover formed to provide a thrust securing system preferably after lowering the lowest chamber segment on the foundation element.

In the simplest case, a connection is made by pouring out an intermediate area between the chamber segment wall of the lowest chamber segment and a bearing surface of the thrust securing system, for diverting transverse forces. The use of a length adjustable thrust securing system may also be envisaged which enables to establish the proper distance between the chamber segment wall of the lowest chamber segment and the thrust connection.

The invention is described more in detail below using exemplary embodiments and in connection with figure illustrations. The following details are shown:

Figure 1:
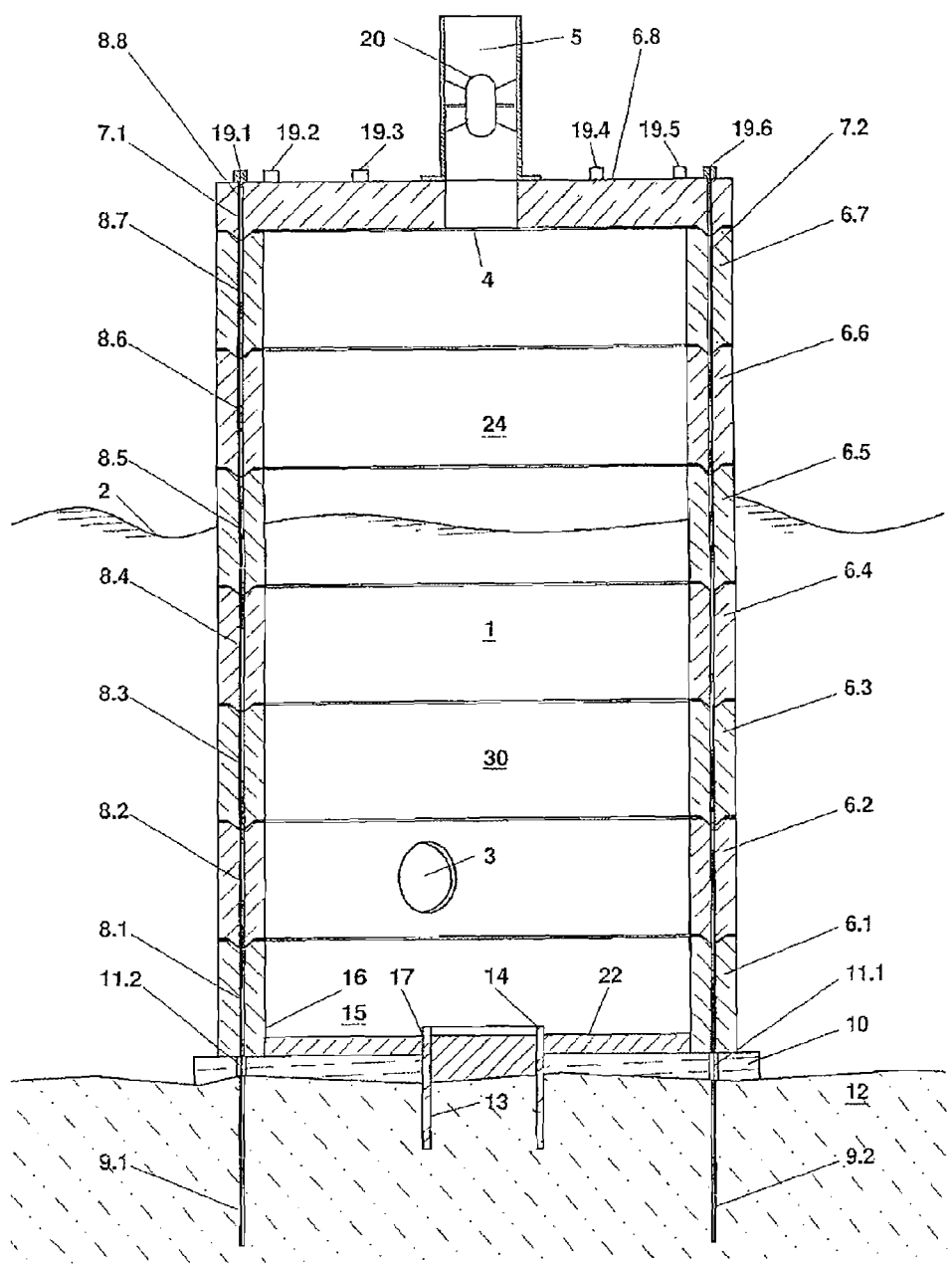
FIG. 1 shows a wave chamber according to the invention in longitudinal section.

FIG. 1 is a simplified diagram of a wave chamber 1 according to the invention, a free-standing stack 30 of a plurality of chamber segments 6.1, ..., 6.8, resting on the bottom of the body of water 12, which are made as ring-shaped elements of seawater-proof armored concrete. These are braced vertically by a large number of traction elements 7.1, ..., 7.2, whereas the traction elements 7.1, 7.2 are anchored in the bottom of the body of water 12 using drilling anchors (9.1, 9.2) and more advantageously stretch over the whole vertical extension of the wave chamber 1. The water inlet opening 3 leading to the wave chamber 1 is provided in the chamber segment 6.2. The air compartment 24 inside the wave chamber 1 emerges on an outlet 4 in the chamber segment 6.8 utilized as a lid, into a ventilation channel 5, in which an air turbine 20 is installed, for instance a Wells turbine.

For the represented, advantageous embodiment, the traction elements 7.1, 7.2 run in guiding means in the form of passage openings which are formed in the walls of the chamber segments 6.1, ..., 6.8. In FIG. 1, exemplary passage openings along the traction element 7.1 are designated by the reference signs 8.1, ..., 8.8. If at least two such traction elements 7.1, 7.2 and preferably more than two traction elements 7.1, 7.2 running and distributed equidistantly over the envelope surface of the chamber 1 are used, lateral guidance is ensured during the lowering process of individual chamber segments 6.1, ..., 6.8. Final lateral centering involves longitudinal bracing of the traction elements 7.1, 7.2. In so doing, the relative orientation of adjacent chamber segments 6.1, ..., 6.8 is assisted by self-centering devices 23 on the joint areas of the chamber segments 6.1, ..., 6.8.

FIG. 1 shows moreover a thrust securing system 13 in the form of a hollow element 14 inserted into the bottom of the body of water. A thrust connection 22 leading to the vertically braced stack 30 of the chamber segments 6.1, ..., 6.8 is formed by a poured out intermediate region 15 between the chamber segment wall 16 of the lowest chamber segment 6.1 and a bearing surface 17, in this instance the outer wall of the hollow element 14.

Figure 2:
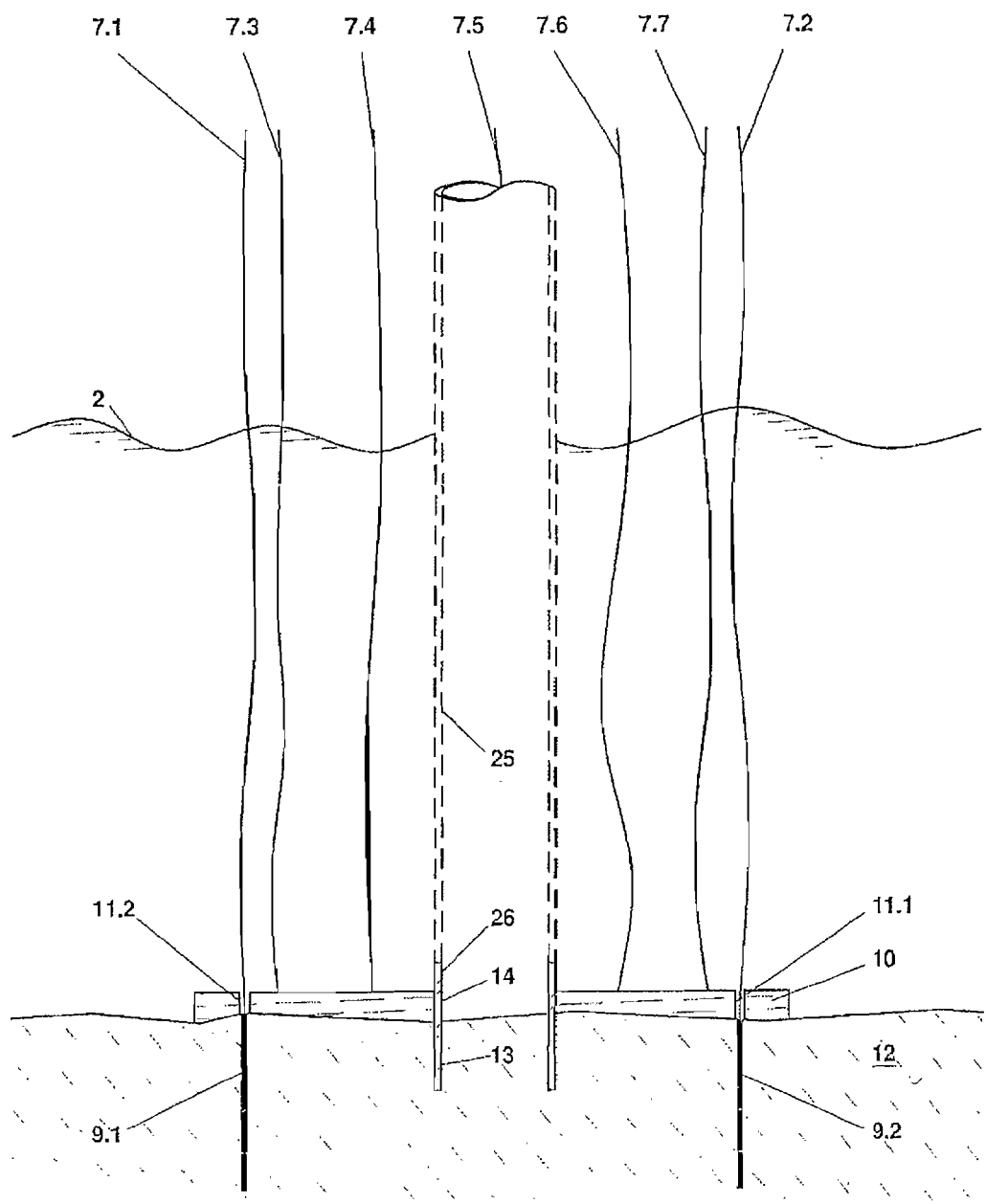
FIG. 2 shows the construction of the foundation of the wave chamber of FIG. 1.

A preferred method of erecting the wave chamber according to the invention is depicted below using FIGS. 2 and 3: A steel tube 25 is first of all screwed in down to a predetermined depth into the bottom of the body of water 12. Said steel tube 25 serves as a temporary foundation. A foundation element 10 is arranged around said tube on the bottom of the body of water 12, on which foundation element the stack of the chamber segments 6.1, ..., 6.8 is mounted later. A prefabricated, ring-shaped concrete element which is lowered along the steel tube 25 can be used as a foundation element 10. To do so, appropriate measures are carried out for horizontal orientation of the platform for the chamber segments. A prefabricated foundation element 10 may accordingly include lifting devices which are supported against the bottom of the body of water 12. Moreover, additional possible cavities present under a foundation element 10 after the lowering process can be cemented. The foundation element 10 can be alternately cast on site. Moreover, according to the nature of the bottom of the body of water 12, the foundation element 10 can be fitted with a protection against washing out which is not represented in detail on the figures.

According to an advantageous embodiment, drilling anchors 9.1, 9.2 are placed in a predetermined pattern for the traction elements 7.1, ..., 7.7. The foundation element 10 is used here preferably as a template inasmuch as said foundation element comprises centering devices 11.1, 11.2 for placing the drilling anchors 9.1, 9.2. In case of a foundation element 10 cast on the bottom of the body of water 12, sleeve elements corresponding to the requested drilling pattern are inserted into the shell for obtaining the centering devices 11.1, 11.2. In the case of a prefabricated foundation element 10, the passage openings serving as centering devices 11.1, 11.2 are already arranged.

In a further step of the method, the steel tube 25, which in this instance serves as a thrust securing system 13, is cut to length in such a way that a collar 26 protruding over the foundation element 10 remains standing. The parts of the steel tube 25 to be separated are accordingly represented in dotted lines in FIG. 2. To do so, the collar 26 enables to form a thrust connection 22. Its realization is depicted using FIG. 3: The intermediate area 15 between the chamber segment wall 16 on the inner face of the lowest chamber segment and the bearing surface 17 on the collar 26 is cemented after lowering the lowest chamber segment 6.1 on the foundation element 10. Accordingly, the internal area of the thrust securing system 13 can be poured out. In a preferred variation, the steel tube 25 is cut to length only after piling up the chamber segments 6.1, ..., 6.8, which form the side walls of the wave chamber 1 so that said operation may assist the guiding and orientation when lowering the chamber segments.

An adjustable thrust connection is used alternately which is not represented in detail on the figures. Such a connection may enable to centre the lowest chamber segment 6.1 on the foundation element 10 with respect to the thrust securing system 13 after the lowering process. The intermediate area 15 can additionally be poured out after said adjustment. The transverse force acting upon the chamber segment 6.1 in future operation is alternately absorbed by fixing the adjustable thrust connection 22.

The individual chamber segments 6.1, 6.8 are lowered along the traction elements 7.1, ..., 7.7, which for that purpose are prestressed by a device, not represented in detail, on a watercraft utilized for the installation. FIG. 3 clearly shows the lowering of the chamber segment 6.2 onto the lowest chamber segment 6.1 by means of a non-illustrated ship crane. In that case, the traction elements 7.1, ..., 7.7 run in passage openings 8.1, 8.2 in the chamber segments 6.1, 6.2. A chamber segment is then strung on at least two traction elements 7.1, 7.7 before being lowered.

Figure 3:
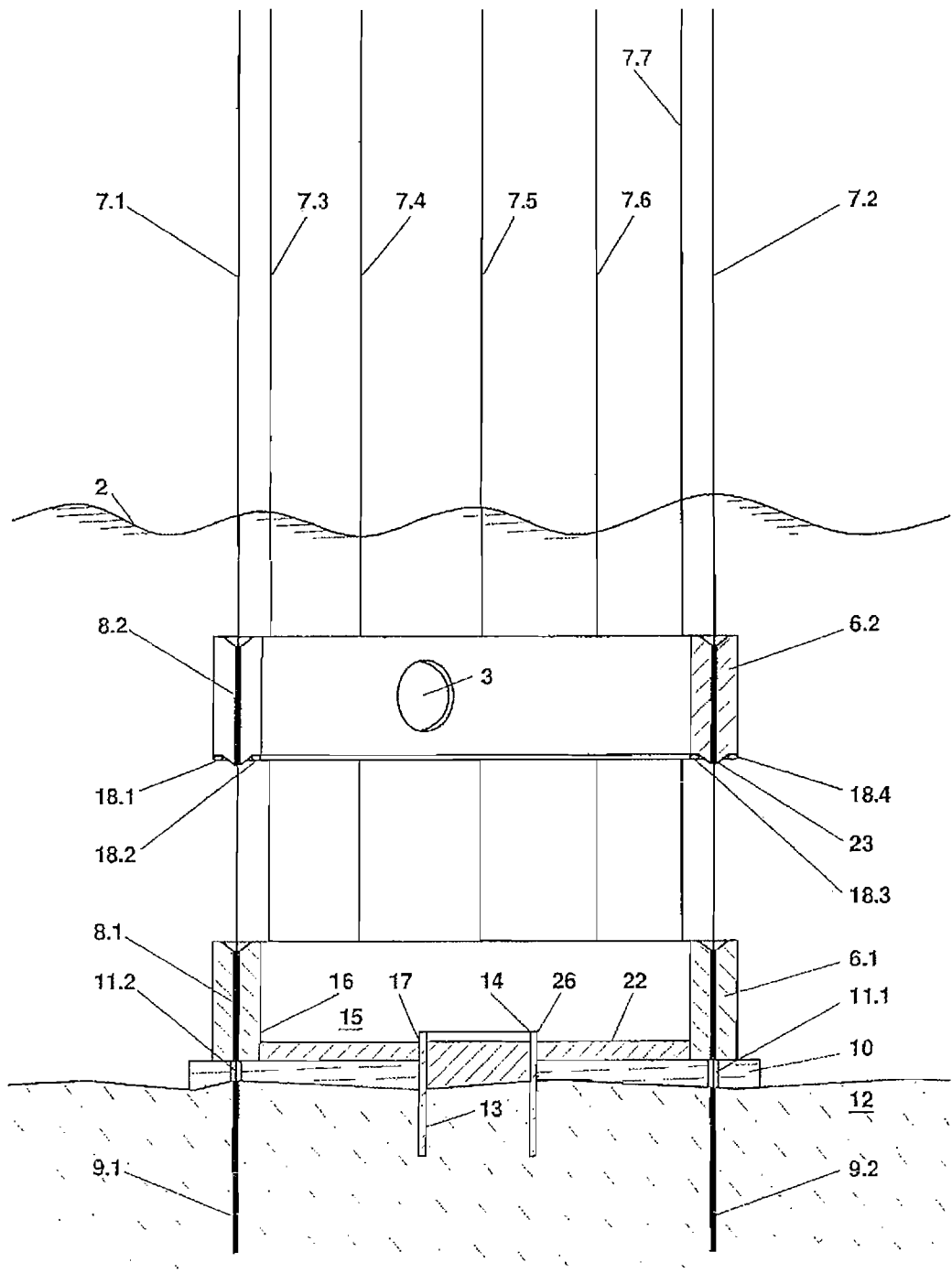
FIG. 3 shows the setting up of a chamber segment along the guiding means provided by the traction elements for the wave chamber of FIG. 1.

Moreover, FIG. 3 is a diagrammatic representation of the gaskets 18.1, . . . 18.4 at the abutment points between the chamber segments 6.1, 6.2 in the region of the self-centering device 23, which gaskets ensure a water and airtight seal due to the own weight of the chamber segment 6.2 as well as the vertical bracing provided by the traction elements 7.1, . . . , 7.7 in the final assembled state. Alternately, an integral sealing element extending over the whole external and internal wall of the stack or a sealing coat can be applied instead of interposed gaskets 18.1, . . . , 18.4 after the erection and the bracing of the stack composed of chamber segments 6.1, . . . , 6.8. Such operations can be carried out with a closed water inlet opening 3 and a pumped dry internal area of the wave chamber 1, once the chamber segment 6.8 utilized as a cover has been set up and the traction elements 7.1, . . . , 7.7 have been braced by means of the clamping elements 19.1, . . . , 19.6.

Figure 4:
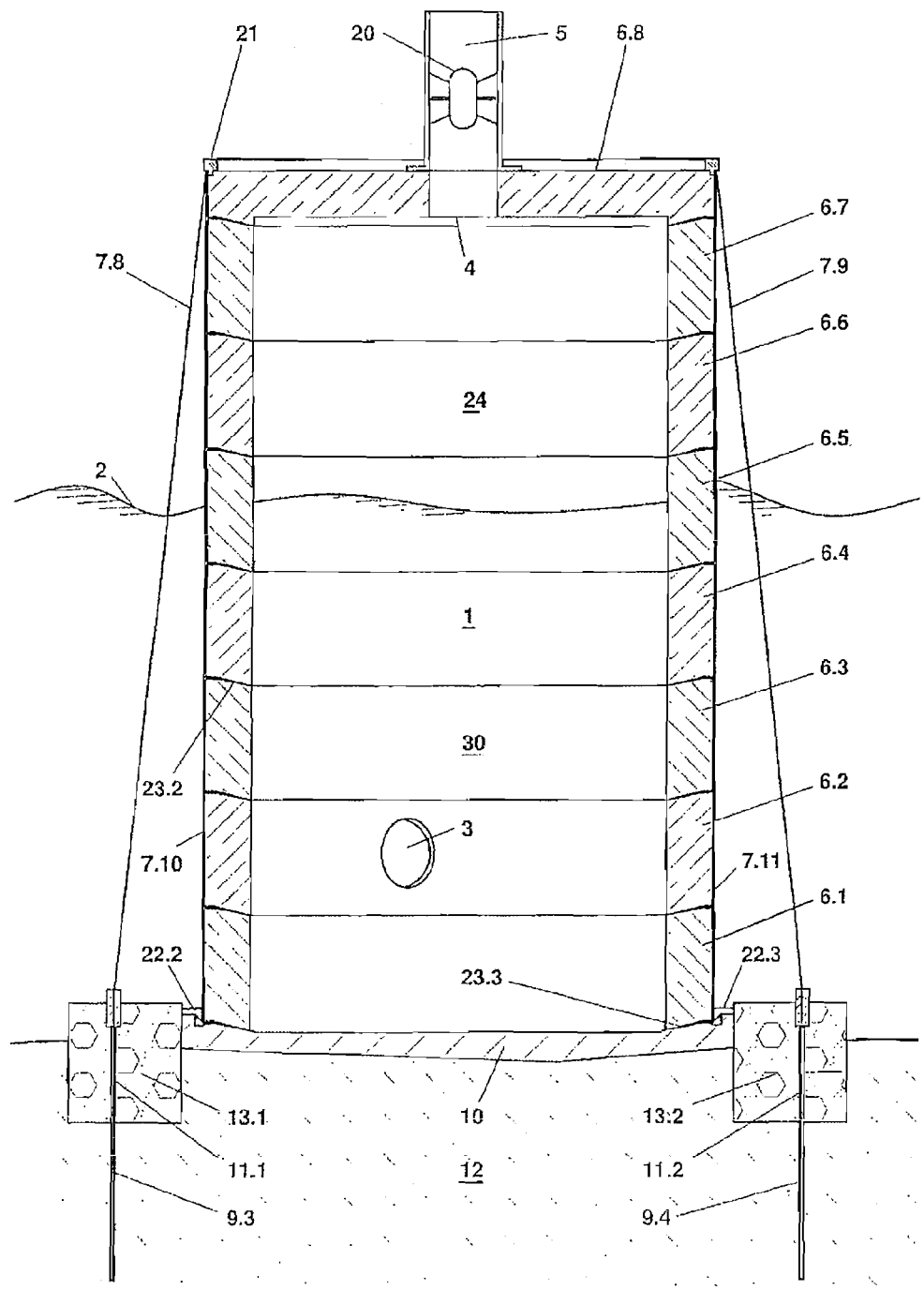
FIG. 4 shows a wave chamber according to the invention according to an alternative embodiment in longitudinal section.

FIG. 4 shows an alternative embodiment for a wave chamber according to the invention, for which inclined traction elements 7.8, 7.9 are used. These create a vertical brace in the sense of a vertical force component upon the chamber segments 6.1, . . . , 6.8. The traction elements 7.8, 7.9 extend from concrete elements which provide a thrust securing system 13.1, 13.2 and which externally surround a cast-in foundation element 10. The thrust securing systems 13.1, 13.2 embedded into the bottom of the body of water 12 can be used as a shell for the production of the foundation element 10.

Moreover, the thrust securing systems 13.1, 13.2 can be used as centering devices 11.1, 11.2 for placing drilling anchors 9.3, 9.4. In the illustrated embodiment, the traction elements 7.8, 7.9 extend from the drilling anchors 9.3, 9.4. Alternately, according to the nature of the bottom of the body of water 12 the bracing process can be done without drilling anchors 9.3, 9.4 directly at the thrust securing systems 13.1, 13.2 arranged laterally so that a gravity foundation, non-illustrated in detail, is formed by a corresponding sizing of the thrust securing system 13.1, 13.2 as well as of the foundation element 10.

Traction elements 7.10, 7.11, running parallel to the outer wall of the chamber segments 6.1, . . . , 6.8 are represented moreover in FIG. 1, which traction elements moreover enable vertical bracing of the stack of the chamber segments 6.1, . . . , 6.8. Besides, these traction elements 7.10, 7.11 running parallel to the outer wall of the wave chamber are used for positioning the individual chamber segments 6.1, . . . , 6.8 during the lowering process. Guiding means which cooperate with traction elements 7.10, 7.11 can be provided on the outer walls of the chamber segments 6.1, . . . , 6.8. These are not represented in detail in FIG. 4. The outer guiding means of the traction elements 7.10, 7.11 enables simplified construction of the self-centering device 23.2 for the chamber segments 6.1, . . . , 6.8 as conical surfaces as well as the use of two-dimensional sealing elements. The erection of a wave chamber according to the invention can additionally be simplified in such a way that the individual chamber segments 6.1, . . . , 6.8 can then be piled on top of one another without the traction elements 7.8, . . . , 7.11. To do so, a self-centering device 23.3 intended for setting up the lowest chamber segment 6.1 on the foundation element 10 is provided additionally to the self-centering device 23.2, between the individual chamber segments 6.1, 6.8.

In a following step of the method, the stacked chamber segments 6.1, . . . , 6.8 are by means of the previously installed and externally running traction elements 7.8, . . . , 7.11. Consequently, the wave chamber 1 is completed by the installation of a thrust connection 22.1, 22.2 between the external thrust securing systems 13.1, 13.2 and the external circumference of the lowest chamber segment 6.1.

Further embodiments of the invention can be contemplated. It is thus possible to split the vertically stacked chamber segments 6.1, . . . , 6.8 by dividing them longitudinally into individual partial components. Besides, intermediate elements can be provided between individual chamber segments 6.1, 6.8 for absorbing transverse forces in addition to fulfilling their sealing function.

LIST OF REFERENCE NUMBERS

1 Wave chamber
2 Water surface
3 Water inlet opening
4 Outlet
5 Ventilation channel
6.1, . . . , 6.8 Chamber segment
7.1, . . . , 7.11 Traction element
8.1, . . . , 8.8 Passage openings
9.1, 9.2, 9.3, 9.4 Drilling anchors
10 Foundation element
11.1, 11.2 Centering devices
12 Bottom of the body of water
13, 13.1, 13.2 Thrust securing system
14 Hollow element
15 Intermediate area
16 Chamber segment wall
17 Bearing surface
18.1, . . . , 18.4 Seal
19.1, . . . , 19.6 Clamping element
20 Air turbine
21 Clamping ring
22, 22.1, 22.2 Thrust connection
23, 23.2, 23.3 Self-centering device
24 Air compartment
25 Steel tube
26 Collar
30 Stack

The invention claimed is:

1. A wave chamber for a wave power plant having a water inlet opening and an outlet leading to a ventilation channel including an air turbine, the wave chamber comprising:
a free-standing stack of a plurality of chamber segments braced vertically by traction elements;
wherein the lowest chamber segment of the plurality of chamber segments is associated at least indirectly with a thrust securing system, and wherein the thrust securing system contains a hollow element for insertion inserted into a bottom of a body of water.

2. The wave chamber according to claim 1, wherein the traction elements stretch over the whole vertical extension of the stack of the chamber segments.

3. The wave chamber according to claim 1, wherein the traction elements run in guides on the chamber segments.

4. The wave chamber according to claim 2, wherein the traction elements run in guides on the chamber segments.

5. The wave chamber according to claim 3, wherein the guides are arranged as passage openings in the walls of the chamber segments.

6. The wave chamber according to claim 4, wherein the guides are arranged as passage openings in the walls of the chamber segments.

7. The wave chamber according to claim 1, wherein the traction elements are for anchoring in the bottom of the body of water at least indirectly using drilling anchors.

8. The wave chamber according to claim 2, wherein the traction elements are for anchoring in the bottom of the body of water at least indirectly using drilling anchors.

9. The wave chamber according to claim 3, wherein the traction elements are for anchoring in the bottom of the body of water at least indirectly using drilling anchors.

10. The wave chamber according to claim 4, wherein the traction elements are for anchoring in the bottom of the body of water at least indirectly using drilling anchors.

11. The wave chamber according to claim 7, wherein the lowest chamber segment rests on a foundation element having centering devices for drilling anchors.

12. The wave chamber according to claim 1, wherein the hollow element is arranged inside the lowest chamber segment.

13. The wave chamber according to claim 1, wherein the chamber segments are designed as prefabricated concrete components.

14. A wave chamber for a wave power plant having a water inlet opening and an outlet leading to a ventilation channel including an air turbine, the wave chamber comprising:
   a free-standing stack of a plurality of chamber segments braced vertically by traction elements;
   wherein the lowest chamber segment of the plurality of chamber segments is associated at least indirectly with a thrust securing system, wherein a thrust connection is installed in an intermediate area between a chamber segment wall of the lowest chamber segment wall and a bearing surface of the thrust securing system.

15. A method of manufacture of a wave chamber for a wave power plant having a water inlet opening and an outlet leading to a ventilation channel including an air turbine, the method comprising:
   piling up several chamber segments to form a free-standing stack; and
   bracing the piled up chamber segments with traction elements in vertical direction;
   wherein the traction elements are for anchoring in a bottom of the body of water with drilling anchors placed using a centering device, which is part of a foundation element for the stacked chamber segments.

16. A method of manufacture of a wave chamber for a wave power plant having a water inlet opening and an outlet leading to a ventilation channel including an air turbine, the method comprising:
   piling up several chamber segments to form a free-standing stack;
   bracing the piled up chamber segments with traction elements in vertical direction;
   providing a hollow element for insertion into a bottom of the body of water, which provides a thrust securing system; and
   forming a thrust connection between the lowest chamber segment and the hollow element.

* * * * *